United States Patent [19]
Derka

[11] Patent Number: 5,332,565
[45] Date of Patent: Jul. 26, 1994

[54] MANUFACTURE OF FERRIC SULPHATE COMPOUNDS

[75] Inventor: Jaroslav R. Derka, Pearlington, Miss.

[73] Assignee: B.P.M. Industries, Inc., Schererville, Ind.

[21] Appl. No.: 986,025

[22] Filed: Dec. 4, 1992

Related U.S. Application Data

[63] Continuation-in-part of Ser. No. 765,498, Sep. 26, 1991, Pat. No. 5,194,240, and a continuation-in-part of Ser. No. 718,780, Jun. 21, 1991, Pat. No. 5,194,241, which is a continuation-in-part of Ser. No. 623,264, Dec. 6, 1990, abandoned, said Ser. No. 765,498, is a continuation of Ser. No. 623,264, Dec. 6, 1990, abandoned, which is a continuation of Ser. No. 494,808, Mar. 14, 1990, abandoned, which is a continuation of Ser. No. 281,332, Dec. 8, 1988, abandoned.

[51] Int. Cl.$^5$ .................. C01G 49/14; C01G 49/02
[52] U.S. Cl. ................ 423/558; 423/143; 423/145; 423/DIG. 3
[58] Field of Search ............. 423/41, 143, 145, 150, 423/558, DIG. 3

[56] References Cited

U.S. PATENT DOCUMENTS

| | | | |
|---|---|---|---|
| 548,580 | 10/1895 | McCullock | 423/558 |
| 1,384,974 | 7/1921 | Shaw | 423/558 |
| 1,430,551 | 10/1922 | Herrly | 423/558 |
| 1,503,229 | 7/1924 | Clark | 423/146 |
| 1,649,152 | 11/1927 | Clark | 423/146 |
| 2,128,311 | 8/1938 | Mertes | 423/104 |
| 2,196,584 | 4/1940 | Edison | 423/558 |
| 2,213,907 | 9/1940 | Fleckenstein et al. | 423/659 |
| 2,296,423 | 9/1942 | Clark | 423/145 |
| 2,871,116 | 1/1959 | Clark | 423/558 |
| 3,888,748 | 6/1975 | Brennecke | 423/145 |
| 4,152,409 | 5/1979 | Nagao et al. | 423/659 |
| 4,234,560 | 11/1980 | Kuerten et al. | 423/DIG. 9 |
| 4,647,307 | 3/1987 | Raudsepp et al. | 423/143 |
| 4,693,881 | 9/1987 | Millier | 423/558 |
| 4,818,514 | 4/1989 | Miller | 423/558 |
| 5,194,240 | 3/1993 | Derka | 423/558 |
| 5,194,241 | 3/1993 | Derka | 423/558 |

FOREIGN PATENT DOCUMENTS

| | | | |
|---|---|---|---|
| 0379204 | 10/1990 | European Pat. Off. | 423/558 |
| 49-53195 | 5/1974 | Japan | 423/558 |
| 49-31638 | 8/1974 | Japan | 423/558 |
| 50-106897 | 8/1975 | Japan | 423/558 |
| 61-286228 | 12/1986 | Japan . | |
| 700450 | 12/1979 | U.S.S.R. | 423/558 |

Primary Examiner—Gary P. Straub
Attorney, Agent, or Firm—Ivor M. Hughes; Neil H. Hughes

[57] ABSTRACT

A process is provided for the manufacture of ferric sulphate compounds from ferrous sulphate in a closed vessel containing a liquid phase and a vapor phase, the process comprising the oxidation of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2}NO_2 \rightarrow$ $$Fe_n(SO_4)_{\frac{3n-y}{2}}(OH)_y + \left(\frac{n-2y}{2}\right)(H_2O) + \frac{n}{2}NO$$

wherein n is any integer greater than or equal to two (2) and y is any integer which is equal to, or greater than zero (0) and less than 3n and wherein the oxidation of $Fe^{++}$ is affected by spraying the liquid phase including a solution containing $Fe^{++}$ introduced to the closed vessel, through a reacting cloud comprising NO, $NO_2$ and $O_2$ enclosed in the vapor space of the closed vessel and wherein substantially only Ferric ions is present in the liquid phase in the closed vessel relative to the amounts of Ferric and Ferrous ions prior to the addition of $FeSO_4$.

37 Claims, 3 Drawing Sheets

MANUFACTURE OF FERRIC SULPHATE COMPOUNDS

This application is a continuation-in-part application of application Ser. No. 07/765,498 filed Sep. 26, 1991, now U.S. Pat. No. 5,194,240 which application is a continuation of application Ser. No. 07/623,264 filed Dec. 6, 1990 (now abandoned) which is a continuation of application Ser. No. 07/494,808 filed Mar. 14, 1990 (now abandoned) which is a continuation of application Ser. No. 07/281,332 filed Dec. 8, 1988 (now abandoned) and a continuation-in-part application of application Ser. No. 07/718,780 filed Jun. 21, 1991, now U.S. Pat. No. 5,194,241 which was a continuation-in-part application of application Ser. No. 07/623,264, filed Dec. 6, 1990, now abandoned (discussed above) all of which are incorporated herein by reference.

FIELD OF INVENTION

This invention relates to the manufacture of ferric sulphate and other ferric compounds such as hydroxylated ferric sulphate compounds from ferrous sulphate utilizing ($NO_x$) as a catalyst and oxygen as the oxidant. [$NO_x$ is known to persons skilled in the art as essentially a mixture of NO and $NO_2$ in undetermined ratios. Thus x is considered to be a number between 1 and 2 inclusive of 1 and 2.]

BACKGROUND OF THE INVENTION

Presently it is known to oxidize $FeSO_4$ to $Fe_2(SO_4)_3$ by $HNO_3$ (nitric acid) (for example U.S. Pat. No. 2,196,584). The reaction is described by the following simplified equation:

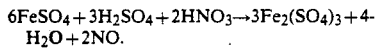

$$6FeSO_4 + 3H_2SO_4 + 2HNO_3 \rightarrow 3Fe_2(SO_4)_3 + 4H_2O + 2NO.$$

The disadvantage of this process is that the released NO has to be taken out of the reactor, oxidized to $NO_2$, polymerized to $N_2O_4$ and absorbed as $HNO_3$. The oxidation of NO to $NO_2$ has to be performed at low temperatures (below 120° C.) and is accompanied by the evolution of a substantial amount of heat, requiring large heat exchangers for the removal of this heat. As the reaction itself is relatively slow to reach completion a large reaction space is needed to provide sufficient residence time and the $HNO_3$ recovery section adds complications, is bulky and expensive. Another problem is that it is practically impossible to recover 100% of $NO_x$ and the emissions are, due to the poisonous nature of both NO and $NO_2$, environmentally unacceptable.

Another process employed provides for the oxidation of ferrous iron at elevated pH. In this process, it is known that the rate of the oxidation in acidic solutions is negligible for all practical purposes, however the reaction proceeds quite rapidly at pH=5 or higher. This approach has three main disadvantages:
(a) The $SO_4$ ions coming with the $FeSO_4$ have to be neutralized.
(b) The products of oxidation (ferric hydroxide and/or oxides) have to be separated from the products of $SO_4$ neutralization. This operation itself poses a difficult problem which is compounded by the requirements to dispose of the sulphate solution.
(c) Ferric oxides have to be reacted with the full amount of $H_2SO_4$ to form $Fe_2(SO_4)_3$.

Oxidation in an acidic solution by utilizing a catalyst - charcoal has been performed, however the rate of oxidation increases with molar ratio $C/Fe_t$ and at technically feasible values of this ratio the rate of oxidation is quite low. Attempts to increase the rate by increasing the charcoal content introduces frothing problems and a prohibitive cost of charcoal.

Another large group of processes utilizes oxidation by oxygen (either from air or in elemental form) catalyzed by $NO_x$ dissolved in the oxidized solution in a form of $FeSO_4*NO$.

Typical examples are:
1) United Kingdom Patent No. 17,112, N. McCulloch, 1894,
2) U.S. Pat. No. 4,693,881, R. Miller, 1987,
3) Australian Patent No. 71,741, Y. Mikami, 1974,
4) Japanese Patent No. 49-31638, S. Takada, 1974,
5) Japanese Patent No. 61-286228, Nittetsu Mining KK.

These processes are characterized by low operating temperature (<60° C.) within the range of stability of $FeSO_4*NO$ complex and the oxygen (or air) is generally bubbled through the reacting solution. Oxygen has to enter solution to react with the NO complex thus the rate of reaction is hindered by low solubility of oxygen and the time required for completion of oxidation is very long. Quoting Mikami: "2.5 l. of ferrous sulphate slurry were oxidized for 17 hours". (This is to compare with our oxidation rate of 2.25 l. completely oxidized in 20 minutes.) Miller in his simplest version releases the desorbed $NO_x$ with off-gas to atmosphere. Quoting: "none of the NO which reaches the top of the regeneration reactor is recovered".

The process is not environmentally safe as it discharges large quantities of off-gas containing 0.03–0.15% NO.

Miller tries to solve this problem by complicated systems for recovery of the desorbed NO including conversion to and recovery as $HNO_3$.

This is to compare with my system where NO is permanently closed in the reactor gas space and only a small bleed-off stream (approximately 3 m³/h), after removal of NO by feed slurry, leaves the process.

It is therefore an object of this invention to provide an improved process for the manufacture of ferric sulphate and other ferric compounds such as hydroxylated ferric sulphate compounds.

It is a further object of the invention to provide such process which is very efficient and environmentally safe.

Further and other objects of this invention will be realized by those skilled in the art from the following summary of invention and detailed description of the embodiments thereof.

SUMMARY OF THE INVENTION

According to one aspect of the invention, there is provided a process for the manufacture of ferric sulphate compounds (including ferric sulphate and hydroxylated ferric sulphate compounds) from ferrous sulphate (in one embodiment crystals, in another embodiment with the addition of pickle liquor) by the oxidation of $Fe^{++}$ to $Fe^{+++}$ under pressure utilizing ($NO_x$) as a catalyst and commercial oxygen in a closed vessel having a liquid phase and a vapour phase wherein the liquid phase comprises substantially (in one embodiment at least about 95%) Ferric ion relative to the Ferric and Ferrous ions present in the vessel prior the addition of Ferrous ion.

The process comprises the following reactions (1) $NO + \frac{1}{2} O_2 \rightarrow NO_2$ and (2) $nFeSO_4 + \frac{n-y}{2} H_2SO_4 + \frac{n}{2} (NO_2) \rightarrow Fe_n(SO_4)_{(\frac{3n-y}{2})}(OH)_y + \frac{n-2y}{2} H_2O + \frac{n}{2} (NO)$ wherein n is any integer greater than, or equal to, two (2) and y is any integer which is equal to, or greater than zero (0) and less than 3n.

$Fe_n(SO_4)_{(\frac{3n-y}{2})}(OH)_y$ is $Fe_2(SO_4)_3$ when n is 2 and y is 0. Thus the process comprises the following reactions:

$NO + \frac{1}{2}O_2 \rightarrow NO_2$, and    (1)

$2FeSO_4 + H_2OS_4 + NO_2 \rightarrow Fe_2(SO_4)_3 + H_2O + NO$.    (2)

Similarly the following ferric sulphate compounds have been produced by the same process steps (with appropriate modifications to yield the desired product);

(a) $Fe_5(SO_4)_7(OH)$, where $y = 1$, $n = 5$ $2\left[ 5(FeSO_4) + 2 H_2SO_4 + \frac{5}{2} NO_2 \right] \rightarrow$ $2\left[ Fe_5(SO_4)_7(OH) + \frac{5}{2} NO + \frac{3}{2} H_2O \right]$ (b) $Fe_6(SO_4)_8(OH)_2$, where $y = 2$, $n = 6$
$[6FeSO_4 + 2 H_2SO_4 + 3NO_2] \rightarrow$
$F_6(SO_4)_8(OH)_2 + 3NO + H_2O]$ and (c) $Fe_7(SO_4)_{10}(OH)$, where $y = 1$, $n = 7$ $2\left[ 7 FeSO_4 + 3H_2SO_4 + \frac{7}{2} (NO_2) \right] \rightarrow$ $2\left[ Fe_7(SO_4)_{10}(OH) + \frac{7}{2} NO + \frac{5}{2} (H_2O) \right]$ According to another aspect of the invention there is provided a process for the manufacture of ferric sulphate compounds from ferrous sulphate in a closed vessel containing a liquid phase and a vapour phase, the process comprising the oxidation between about 70° C. to about 150° C. of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2} NO_2 \rightarrow Fe_n(SO_4)_{(\frac{3n-y}{2})}(OH)_y + \left(\frac{n-2y}{2}\right)(H_2O) + \frac{n}{2} NO$ wherein n is any integer greater than or equal to two (2) and y is any integer which is equal to, or greater than zero (0) and less than 3n and wherein the oxidation of $Fe^{++}$ is affected by spraying the liquid phase including a solution containing $Fe^{++}$ introduced to the closed vessel, through a reacting cloud comprising NO, $NO_2$ and $O_2$ enclosed in the vapour space of the closed vessel and wherein substantially (in one embodiment at least about 95%) only Ferric ion relative to the amounts of Ferric ion in $Fe_n(SO_4)_{(\frac{3n-y}{2})}(OH)_y$ and ferrous ion (added as Ferrous Sulphate) is present in the liquid phase in the closed vessel prior to the addition of $FeSO_4$ preferably through the reacting cloud in the vapour phase and preferably by spraying through the reacting cloud in the vapour phase. The liquid phase in one embodiment fills at least ⅓ of the vessel prior to the addition of Ferrous ion. Preferably the Ferrous Sulphate is added to the vessel by spraying through the reacting cloud in the vessel. However where not feasible (because of the physical condition of the ferrous sulphate (containing stones, which may damage the circulation pump) it may be added to the vessel by any means and the liquid phase containing the ferrous only sprayed through the vapour phase.

Thus according to another aspect of the invention there is provided a process for the manufacture of ferric sulphate compounds from ferrous sulphate in a closed vessel containing a liquid phase and a vapour phase, the process comprising the oxidation between about 70° C. to about 150° C. of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2} NO_2 \rightarrow Fe_n(SO_4)_{(\frac{3n-y}{2})}(OH)_y + \left(\frac{n-2y}{2}\right)(H_2O) + \frac{n}{2} NO$ wherein n is any integer greater than or equal to two (2) and y is any integer which is equal to, or greater than zero (0) and less than 3n and wherein the oxidation of $Fe^{++}$ is affected by spraying a solution containing $Fe^{++}$ through a reacting cloud comprising NO, $NO_2$ and $O_2$ enclosed in the vapour space of the closed vessel and wherein the liquid phase fills at least ⅓ of the vessel and substantially only $Fe_n(SO_4)_{(\frac{3n-y}{2})}(OH)_y$ is present in the liquid phase in the closed vessel prior to the addition of $FeSO_4$ and wherein the liquid phase is sprayed through the vapour phase.

Thus according to another aspect of the invention there is provided a process for the manufacture of ferric sulphate compounds from ferrous sulphate in a closed vessel containing a liquid phase and a vapour phase, the process comprising the oxidation between about 70° C. to about 150° C. of Fe++ to Fe+++ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right) H_2SO_4 + \frac{n}{2} NO_2 \rightarrow$ $Fe_n(SO_4)_{\frac{(3n-y)}{2}}(OH)_y + \left(\frac{n-2y}{2}\right)(H_2O) + \frac{n}{2} NO$ wherein n is any integer greater than or equal to two (2) and y is any integer which is equal to, or greater than zero (0) and less than 3n and wherein the oxidation of Fe++ is affected by spraying a solution containing Fe++ through a reacting cloud comprising NO, NO₂ and O₂ enclosed in the vapour space of the closed vessel and wherein the liquid phase fills at least ⅓ of the vessel and substantially only $Fe_n(SO_4)_{\frac{(3n-y)}{2}}(OH)_y$ is present in the liquid phase in the closed vessel during the addition of FeSO4 and wherein the liquid phase is sprayed through the vapour phase.

Preferably the Fe++ ion (for example FeSO4) is introduced to the closed vessel through the reacting cloud in the vapour phase and preferably by spraying.

Thus according to another aspect of the invention there is provided a process for the manufacture of ferric sulphate compounds from ferrous sulphate in a closed vessel containing a liquid phase and a vapour phase, the process comprising the oxidation between about 70° C. to about 150° C. of Fe++ to Fe+++ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right) H_2SO_4 + \frac{n}{2} NO_2 \rightarrow$ $Fe_n(SO_4)_{\frac{(3n-y)}{2}}(OH)_y + \left(\frac{n-2y}{2}\right)(H_2O) + \frac{n}{2} NO$ wherein n is any integer greater than or equal to two (2) and y is any integer which is equal to, or greater than, zero (0) and less than 3n and wherein the oxidation of Fe++ is affected by spraying the liquid phase including a solution containing Fe++ introduced to the closed vessel, through a reacting cloud comprising NO, NO₂ and O₂ enclosed in the vapour space of the closed vessel and substantially (in one embodiment at least about 95%) only ferric ion relative to the amounts of Ferric ion in $Fe_n(SO_4)_{\frac{(3n-y)}{2}}(OH)_y$ and Ferrous ion (for example added as ferrous sulphate) is present in the liquid phase in the closed vessel during the addition of FeSO₄ once again preferably through the reacting cloud in the vapour phase. Once again preferably the ferrous sulphate is added to the vessel by spraying through the reacting cloud in the vessel. However where not feasible (because of the physical condition of the ferrous sulphate (containing stones) which may damage a circulating pump used) it may be added to the vessel by any means and the liquid phase only sprayed. Once again in one embodiment the liquid phase fills at least ⅓ of the vessel. Once again oxidation of ferrous iron is essentially accomplished in the vapour phase in the reactor which preferably comprises a single vessel.

In the reactor $NO_x$ is trapped in the vapour phase (space) above the solution. The present NO then rapidly reacts with the supplied oxygen according to the reaction:

$NO + \frac{1}{2}O_2 \rightarrow NO_2$.  (1)

The solution containing the FeSO₄ introduced to the circuit or vessel is most preferably sprayed through this "reacting cloud" (the vapour phase essentially comprising NO, NO₂ and oxygen), also cooling the reacting gas by removing the heat of reaction and reacting with formed $NO_x$:

2) $n(FeSO_4) + \frac{n-y}{2} H_2SO_4 + \frac{n}{2} NO_2 \rightarrow$ $Fe_n(SO_4)_{\frac{(3n-y)}{2}}(OH)_y + \frac{n-2y}{2} H_2O + \frac{n}{2} NO$ for example $2FeSO_4 + H_2SO_4 + NO_2 \rightarrow Fe_2(SO_4)_3 + H_2O + NO$.

The NO released by reaction 2) is immediately available for reaction 1). NOx acts as a catalyst in the oxidation process.

The temperature in the reactor is maintained above the point of decomposition (theoretically 60°-65° C.) of the FeSO₄*NO complex (which at lower temperatures is stable and is formed at such lower temperatures). Thus NO produced by reaction 2) is released back to the reacting cloud rather than being oxidized in the solution with the consequent low rate of reaction due to the low solubility of oxygen. The oxidation of NO in the gas phase is a relatively fast well-defined reaction.

The produced solution containing traces of NO is denitrated in a $NO_x$ desorption vessel by bubbling of feed oxygen through the solution before it is used in the reactor for oxidation. The stream of oxygen then carries the desorbed NO back to the "reacting cloud" in the vapor phase - space of reactor.

The produced ferric compound in solution for example Fe₂(SO₄)₃ solution for example may be drawn from the vessel and the ferrous compound precipitated, filtered and stored. Thus according to another aspect of the invention, the process is preferably carried out continuously with the amount of ferric solution removed from the vessel being the same as the amount of Ferrous Sulphate and other materials added.

In another embodiment the oxidation may be carried out continuously in different vessels connected one to the other (liquid phase overflowing to next vessel and vapour phases being interconnected and in communication with one another) or in another embodiment may be carried out in a batch in one vessel. The materials may be added in a sluice tank (FeSO$_4$ and water) and mixed and then fed for continuous processing or batch processing. The H$_2$SO$_4$+NO$_x$ make-up (HNO$_3$) are added directly to the reactor.

In the batch process, the oxygen stream from the denitrator may be also added to the reactor. When the reactions are completed producing $$Fe_n(SO_4)_{(\frac{3n-y}{2})}(OH)_y$$

for example Fe$_2$(SO$_4$)$_3$, the Fe$_2$(SO$_4$)$_3$ solution is removed.

To produce batches successively in the same vessel, only part (for example ⅔) of the volume is removed, and the remaining portion (for example ⅓) is left. This heats the incoming slurry to the temperature required for initiation of the oxidizing reaction. For the reaction to proceed quickly, the temperature should preferably equal or exceed 90° C. Thus the remaining solution provides the temperature for the initiation of the reaction and the "Heat of Reaction" heats the materials added to the reactor. Additionally the final product $$Fe_n(SO_4)_{(\frac{3n-y}{2})}(OH)_y$$

remains in the solution to keep the NO$_x$ out of the solution and in the vapour phase (NO$_x$ has low solubility in the product $$Fe_n(SO_4)_{(\frac{3n-y}{2})}(OH)_y).$$

A small portion of gases present in the vapour phase above the slurry solution are bled off to facilitate the removal of any inert gas present and returned to the sluice tank for mixing with the slurry.

The withdrawn ferric sulphate compound solution is denitrated in NO$_x$ desorption vessel (denitrator) by bubbling oxygen through the solution and subsequent cooling. The solution may then be filtered and sent to product storage.

The heat recovered from the product cooling heat exchanger may be used for preheating of water or pickle liquor needed for preparation of feed slurry.

In one example a slurry of Ferrous Sulphate (to be added to the vessel) is prepared in a "Sluice Tank" by weighing the corresponding amount of crystals and water and subsequently transferred to a feed tank. From the feed tank the slurry is continually pumped by a metering pump to the vessel. Sulphuric acid is metered to the reactor as required for the selected $$\frac{SO_4}{Fe}$$

ratio.

Solution from the reactor is recycled through spray nozzles, thus allowing an intimate contact between solution and the reacting cloud of NO$_x$, Oxygen mixture.

The reacted solution, containing only traces of Fe$^{++}$ may leave the reactor by gravity and may in a denitrator be stripped of dissolved NO$_x$ by purging with Oxygen. The mixture of Oxygen and the stripped NO$_x$ is then returned to the reactor.

The solution level in the denitrator and reactor vessel is controlled by controlling the rate of solution (liquid phase) discharge.

FOR COLD START UPS

The slurry from the Feed Tank and the proportional quantity of Sulphuric Acid may be fed to the reactor until the mixture amounts to approximately ½ of the regular liquid volume. After addition of Nitric Acid the mixture is allowed to oxidize, (continuously recycling with spray nozzles running). When approximately substantially all (something of the order greater that about 95-98%) Fe$^{++}$ is oxidized to the Ferric form the rate of reaction marks a substantial increase. After completion of the oxidation (most NO$_x$ is in the vapour phase (gaseous part) of the reactor because NO$_x$ is substantially insoluble in Fe$_2$(SO$_4$)$_3$ a continuous feed of the slurry and proportional feed rate of Sulphuric Acid are started. From this moment the operation is continuous and the reaction is running at such high rate that the product does not contain a detectable quantity of Ferrous Iron. The Fe$^{++}$ is oxidized in the vapour phase without detectable Fe$^{++}$ in the liquid phase.

BRIEF DESCRIPTION OF THE DRAWINGS

The invention will now be illustrated with reference to illustrated processes according to embodiments of the invention.

Shown schematically in FIG. 1 is a flowsheet illustrating embodiments such processes.

Figure 2:
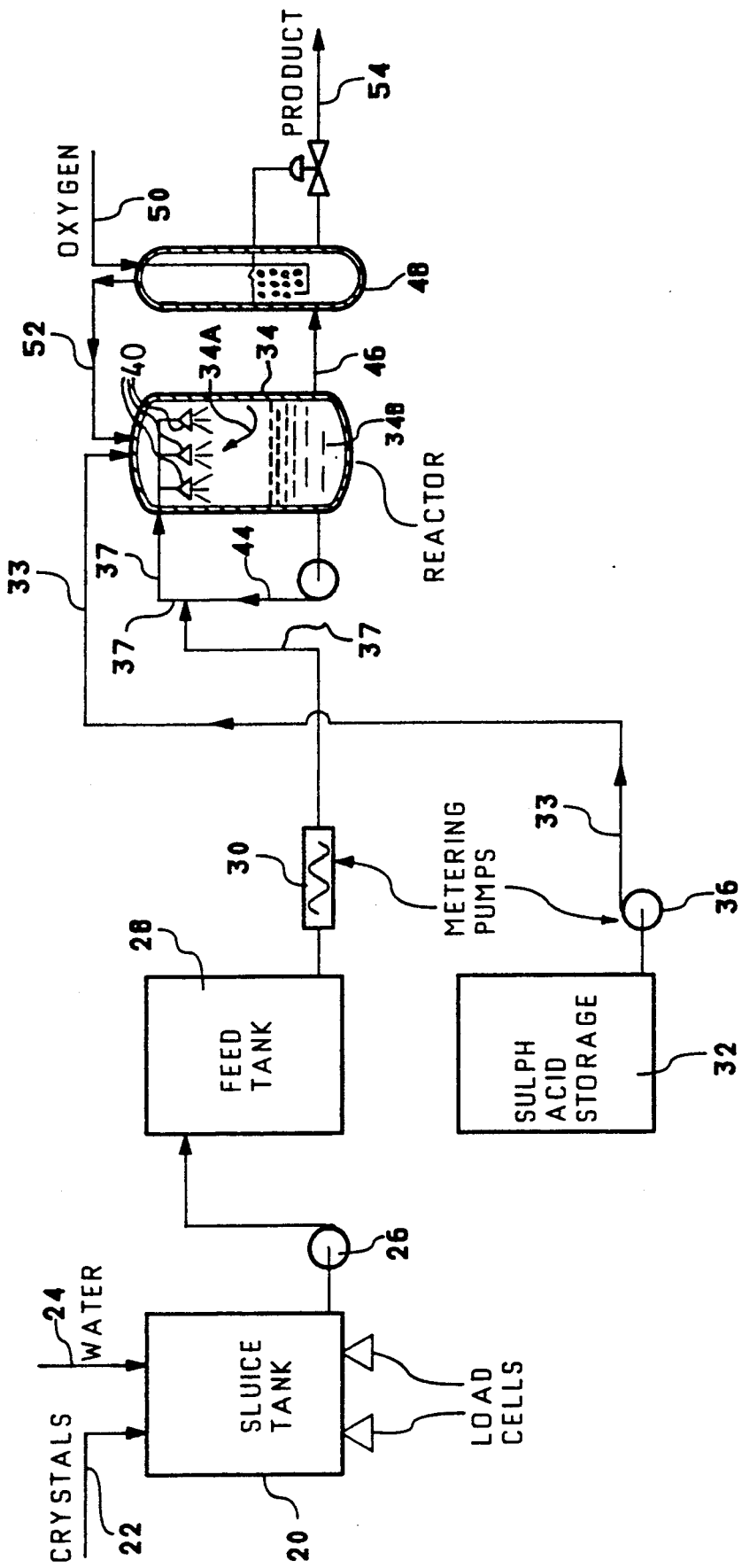

Particulars of a continuous process is illustrated in FIG. 2.

Figure 3:
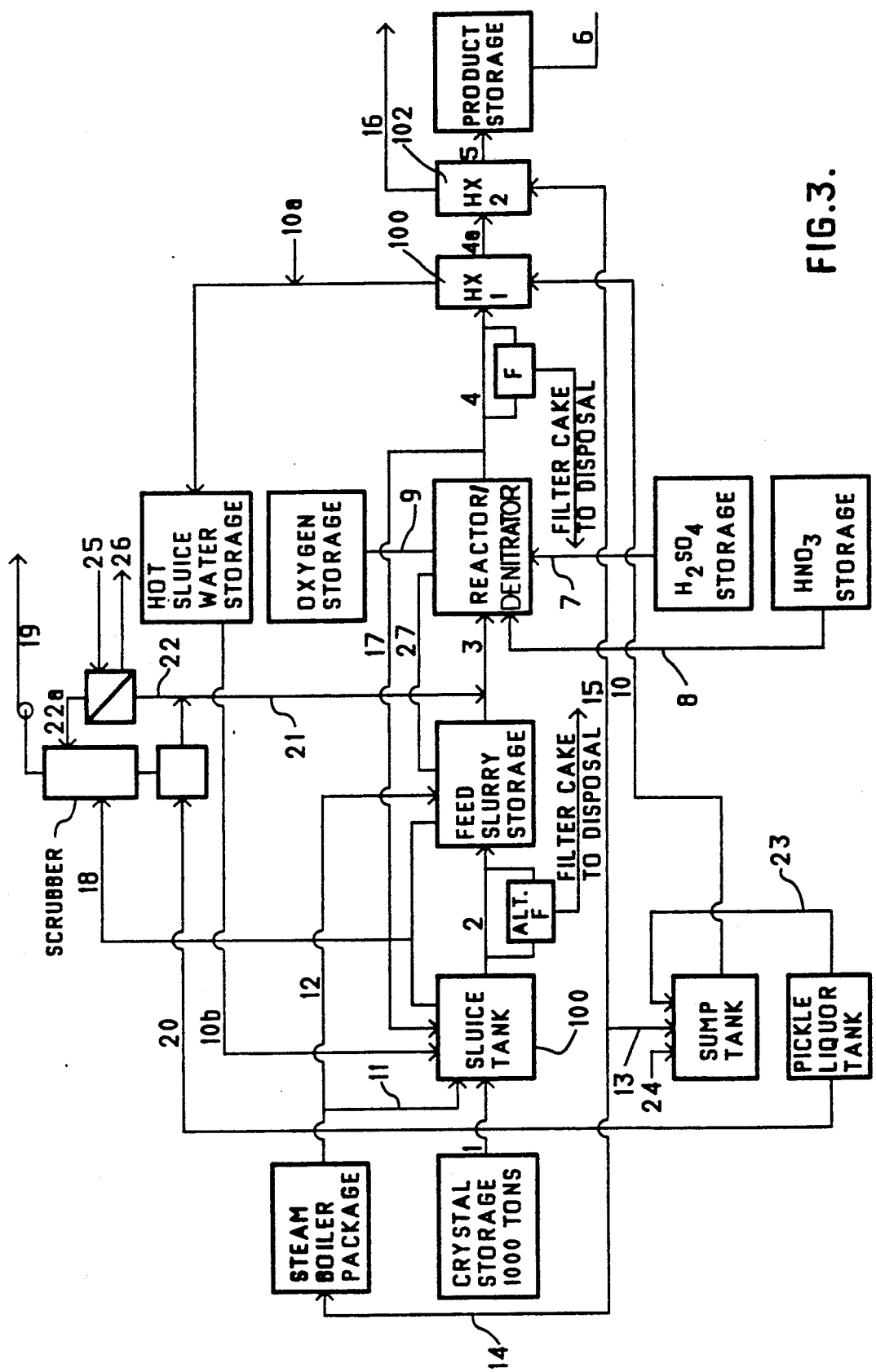

Particulars of a continuous process is illustrated in FIG. 3.

DETAILED DESCRIPTION OF PREFERRED EMBODIMENTS OF THE INVENTION

The invention is illustrated with reference to ferric sulphate manufacture. The processes illustrated apply equally to the manufacture of hydroxylated ferric sulphate compounds.

Ferrous sulphate crystals are, after delumping in a suitable crushing device such as a roller mill (position A), transported by screw conveyor (position B) as stream 1 into a sluice tank (position C). In this tank a suitable slurry is formed by an addition of the required amount of water (stream 2). Instead of water a pickle liquor (stream 15) may be used with consequential savings in crystals and sulphuric acid.

Figure 1:
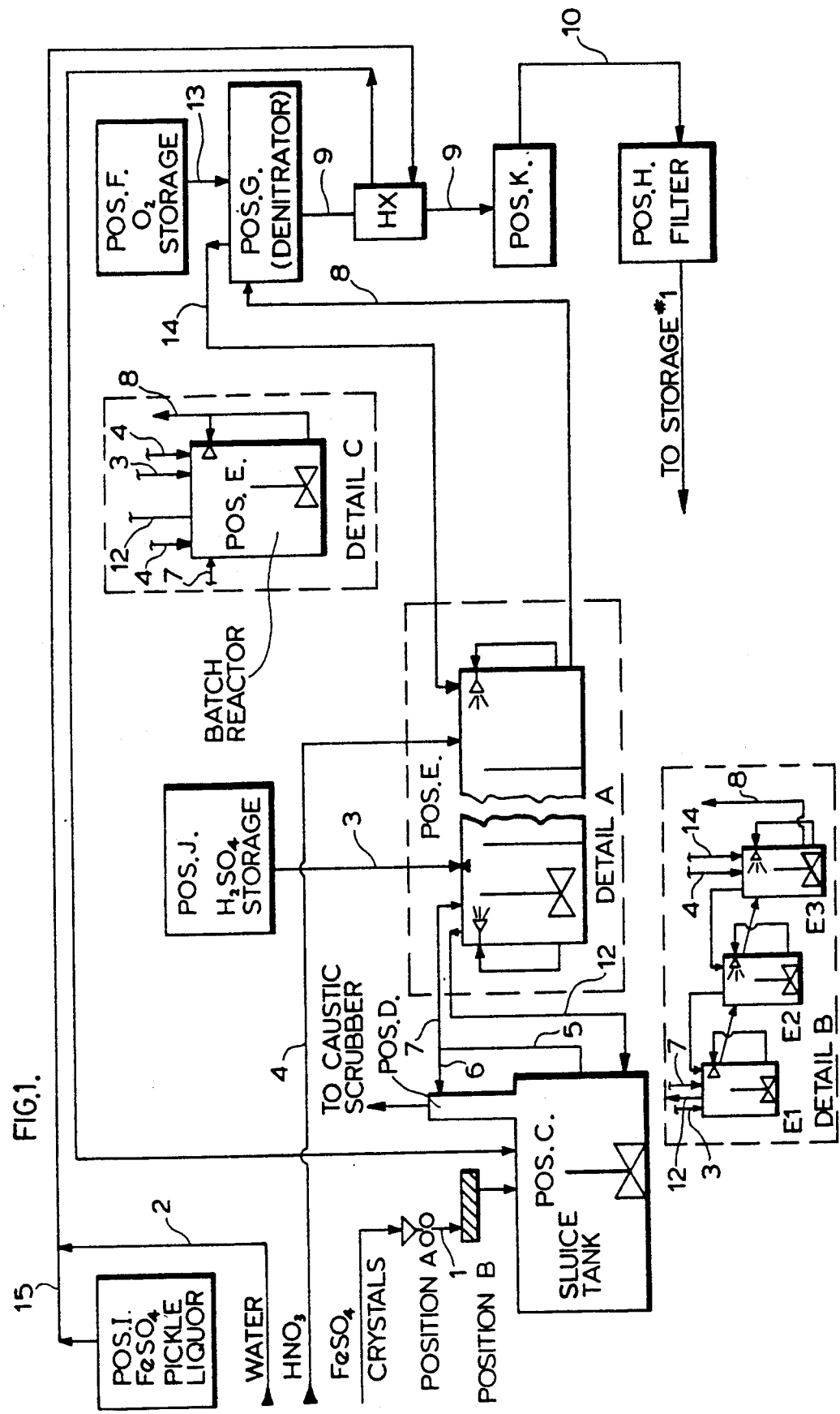

A slurry of correct composition (stream 5) for the reaction:

$$2FeSO_4 + H_2SO_4 + \tfrac{1}{2}O_2 = Fe_2(SO_4)_3 + H_2O$$

is fed (stream 7) as well as sulphuric acid (stream 3) and occasionally HNO$_3$ make-up (stream 4) to a reactor (position E) which can be either continuous - flowsheet (FIG. 1) Details A and B, or batch - Detail C. Detail A illustrates a reactor where a single closed vessel is divided into compartments with the slurry and sulphuric acid added upstream of the vessel and oxygen and HNO$_3$ make-up added downstream. The same with Detail B which illustrates three separate vessels E$_1$, E$_2$, and E$_3$ whose vapour phases are connected and whose liquid phases overflow counter-currently to gas phase - slurry added to upstream vessel $E_1$ with oxygen downstream at vessel $E_3$. With respect to Details A, B and C, position G acts as the denitrator.

In the reactor, oxidation under pressure by oxygen (stream 14) takes place, $NO_x$ acting as the catalyst of oxidation. The function of $NO_x$ can be expressed in a simplified form as:

$$NO + 0.5\ O_2 = NO_2, \quad (1)$$

and the ferrous iron is oxidized:

$$2FeSO_4 + H_2SO_4 + NO_2 = Fe_2(SO_4)_3 + NO + H_2O. \quad (2)$$

The reaction 1) takes place in the reacting cloud consisting of $NO_x$, $O_2$ and water vapour, located in the vapor space of the reactor. There the produced $NO_2$ is contacted by spray of the liquid phase and the reaction 2) proceeds.

The product ferric sulphate solution (stream 8), with some $NO_x$ dissolved in it due to high partial pressure of $NO_x$ in the reactor, is denitrated in the $NO_x$ removal vessel (position G), by purging the solution with bubbles of oxygen required for reaction (stream 13). The oxygen with desorbed $NO_x$ is then fed to the reactor (stream 14). The NO free solution (stream 9) is cooled in heat exchanger (Hx) and sent to a pump tank (position K) and pumped (stream 10) through a clarifier filter (position H) to storage (stream 11). Heat removed in the heat exchanger is used for preheating liquids (water or pickle liquor) for slurry preparation. As commercial oxygen always contains some nitrogen, its accumulation in the vapour space of the reactor is avoided by a small bleed-off stream (stream 12). This bleed-off stream is in one application sent to the bottom of the sluice tank (position C) where $NO_x$ is removed by contact with $FeSO_4$ slurry in the sluice tank. This step utilizes the formation of nitrosyl ferrous sulphate in a $FeSO_4$ solution at temperature $<60°$ C. for the absorption of NO. The $NO_x$ catalyst is then returned to the reactor with the feed slurry (stream 7) introduced through the vapour phase.

In other applications the NO containing gas (stream 13) is scrubbed in a ferrous sulphate scrubber (position D) by $FeSO_4$ slurry (stream 6) because on contact the $FeSO_4$ dissolves the $NO_x$ returning it to sluice tank (position C) and subsequently to reactor (position E). $NO_x$ free gas, for additional safety, leaves the process through a caustic scrubber. Thus $N_2$ (nitrogen) and $O_2$ (oxygen) are permitted to leave to atmosphere.

Typical operating parameters:

| 1) Sluice Tank: | |
|---|---|
| t | ambient, |
| maximum | 60° C. |
| 2) Reactor: | |
| temperature | above decomposition temperature of $FeSO_4 \cdot NO$ complex and preferably about 70° C. to about 150° C., most desirable 90°-120° C. |
| pressure | 20-100 psig, preferably 40-60 psig. |
| 3) Product - ferric sulphate solution: | |
| typical | 190 g. Fe/l, |
| range | 60-250 g. Fe/l. |

In the continuous processes of Details A and B, the volume of $Fe_2(SO_4)_3$ and $H_2SO_4$ being removed (discharged) corresponds to the volume of $FeSO_4$ and being added through the vapour phase. $Fe_2(SO_4)_3$ solution [without $Fe^{++}$ or only trace amounts of $Fe^{++}$] is present at the start in the liquid phase to increase the rate of the reaction.

With respect to Detail C (which depicts a batch process), when $Fe_2(SO_4)_3$ is to be withdrawn, it is preferable that only ⅔ of the volume is removed. The remaining ⅓ volume containing essentially $Fe_2(SO_4)_3$ is usually at a temperature exceeding 90° C., of a temperature at which the reaction proceeds quickly, and thus provides the heat of reaction to cause added cold materials to react quickly to oxidize $Fe^{++}$ to $Fe^{+++}$. As well the $Fe_2(SO_4)_3$ left in the liquid phase keeps NOx in the vapour phase to enable increased rate of reaction due to the decrease in solubility of NO (product of Fe oxidation) in the Ferric Sulphate. In that case more NO is available for oxidation in the gaseous phase.

Solution accumulates in the reactor (detail C). On reaching the high level, the feeding of slurry or solution is stopped and on completion of the oxidation, the product (solution) is released through denitrator (position G) where the product is purged by a stream of oxygen passing from position G into reactor (position E) displacing liquid volume in the reactor (position E).

With reference with FIG. 2, there is illustrated schematically a method of oxidation of the Ferrous to Ferric. A slurry of Ferrous Sulphate is prepared in "Sluice Tank" 20 by weighing the corresponding amount of crystals and water and subsequently transferring the crystals and water along streams 22 and 24 to sluice tank 20. The ferrous sulphate slurry is then transferred by pump 26 to feed tank 28. From the feed tank 28 the slurry is continuously pumped by a metering pump 30 towards the reactor along stream 37. Sulphuric acid is metered from storage 32 to the reactor 34 as required for the selected $$\frac{SO_4}{Fe}$$

ratio by metering pump 36 along stream 33. The mixture is sprayed through the vapour phase 34A in reactor 34 through spray nozzles 40 (stream 37). This is permitted where the "slurry" is clear of stones which can otherwise damage the equipment. If the slurry is heavily contaminated by stones the slurry is dumped directly into the reactor vessel.

Solution from liquid phase 34B of the reactor recycled through stream 44 into stream 37 through spray nozzles 40, thus allowing contact between the liquid phase and the reacting cloud of NOx, Oxygen mixture.

The reacted solution, containing only traces of $Fe^{++}$ leaves the reactor by gravity through stream 46 and is in denitrator 48 stripped of dissolved NOx by purging commercial Oxygen fed along stream 50. The mixture of Oxygen and the stripped NOx is fed to reactor 34 along stream 52. The $Fe_2(SO_4)_3$ product is then removed along stream 54 for cooling (precipitation if desired) storage and use.

The solution level in the denitrator and reactor is controlled by controlling the rate of solution discharge. Thus the volume of liquid phase containing essentially $Fe_2(SO_4)_3$ [with but trace amounts of $Fe^{++}$ (if any)] removed or discharged along stream 46 corresponds to the volume of materials added to the reactor.

FOR COLDS START UPS

The slurry from the Feed Tank 28 and the proportional quantity of Sulphuric Acid may be fed to the reactor 34 until the mixture amounts to approximately ½ of the regular liquid volume. After addition of Nitric Acid the mixture is allowed to oxidize (continuously recycle with spray nozzles running). When in excess of 95% of $Fe^{++}$ (usually in the order of at least about 98%) is oxidized to the Ferric form the rate of reaction marks a substantial increase. After completion of the oxidation (most $NO_x$ is in the vapour phase (gaseous part) of the reactor because $NO_x$ is substantially insoluble in $Fe_2(SO_4)_3$) a continuous $Fe_2(SO_4)_3$ feed of the slurry and proportional feed rate of Sulphuric Acid are started. From that moment the operation is continuous and the reaction is running at such a high rate that the end product discharged along stream 46 does not contain a detectable quantity of Ferrous Iron.

The essentially $Fe_2(SO_4)_3$ containing liquid phase may also be used initially and the reaction may start out at a high rate of reaction.

In a typical example, slurry is prepared by weighing 20028 lbs of Ferrous Sulphate crystals containing 19% of Iron and combining it with 7074 lbs of water. This slurry is fed at a rate of 237 lbs/min to the reactor 34 together with 25.1 lbs of Sulphuric Acid per minute.

Under these conditions the solution is produced at a rate of 21 gallons/min, the $$\frac{SO_4}{Fe}$$

molar ratio is 1.4.

With reference to FIG. 3, the 2400 gallon batches of slurry are prepared in a sluice tank 100 by mixing the crystals of $FeSO_4 * 7 H_2O$ (stream No. 1) with the required amount of hot water (stream No. 10b) and the resulting slurry is then heated by direct steam (stream No. 11) to a temperature of approximately 126 deg. F.

The heated batch of slurry is then transferred (stream No. 2) to the feed tank from where it is continuously fed (stream No. 3) with metered amount of sulphuric acid (stream 7) to an oxidizing reactor. The nitric acid - source of $NO_x$ catalyst (stream No. 8) is added as required. The ferrous sulphate is oxidized by oxygen in the reactor according to the following reactions:

$$2FeSO_4 + H_2SO_4 + NO_2 \rightarrow Fe_2(SO_4)_3 + H_2O + NO \quad (a)$$

$$2NO + O_2 \rightarrow 2 NO_2 \quad (b)$$

The oxygen for reaction (b), (stream No. 9), is first utilized for stripping the dissolved $No_x$ from the oxidized solution in the denitrator it then proceeds to the reactor carrying the stripped $NO_x$ with it. The $NO_x$ stripped from the solution is thus returned to the reactor to fulfill its role of a catalyst, without any emissions to the atmosphere.

The oxidized solution from the denitrator (stream No. 4) is cooled in one of two heat exchangers (HX) before proceeding to storage (stream No. 5). The first HX 100 utilizes product heat for preheating of sluice water (sump water and Pickle liquor). This cooling water (stream No. 10) is provided in the quantity which yields an outgoing water temperature of approximately 194 deg. F. (stream No. 10a). Hot water is accumulated in the hot water tank and utilized for preparation of the feed slurry (stream No. 10b). This arrangement achieves an energy saving and minimizes the steam consumption for slurry heating. When the hot water tank is full, the product is cooled in the second HX 102 by city water (stream No. 15) which after the use is sent to sewer (stream No. 16) unless some other, in-plant use is found.

Any spillage from the process area and drainage from the crystal storage area will be collected in a sump system and recycled (stream No. 24) to the sump tank for use in the process, effectively eliminating any effluents from the plant. Oxygen consumed in the reactor contains traces of inerts (mostly $N_2$). A small bleed-off stream (stream No. 27) is required to prevent the accumulation of inerts in the reactor vapor phase. Because the solubility of NO in the $FeSO_4$ solution is very high the bleed-off stream is first stripped of $NO_x$ by bubbling through $FeSO_4$ slurry in the feed tank. The absorbed $NO_x$ is then returned to the reactor with the slurry feed.

Both the sluice and feed tanks are vented (stream No. 18) through the Pickle liquor scrubber to atmosphere. Any traces of $NO_x$ which were not absorbed by the feed slurry are absorbed by the cold Pickle liquor (stream No. 22a) recycled through the scrubber. To keep the solution cool the recycle is cooled in a heat exchanger cooling water (stream No. 25) which after the use is sent (stream No. 26) to drain. The spent Pickle liquor is subsequently sent to the suction of reactor feed pump (stream No. 21) thus returning to the reactor any $NO_x$ that escaped.

If it is desired to utilize pickle liquor as a source of iron and sulphuric acid, it will be pumped from the storage tank to sump tank only if there is shortage of sump water for process purposes.

The product is loaded from a storage (stream No. 6) to either rail cars or tank trucks.

With respect to the process illustrated in FIG. 3, reactor vessel is 3000 gallons, of which 1500 gallons is the liquid phase, 25 gallons of slurry is added to the reactor and 25 gallons of Ferric Sulphate solution produced is removed per minute. 250 gallons are sprayed through the vapour phase per minute. For cold start ups, 820 gallons are put into vessel and when the production of ferric sulphate proceeds rapidly, the volume is increased until the 1500 gallon operating amount is reached.

The following hydroxylated ferric sulphate compounds have been made by carrying out the process steps in FIG. 3. The concentration of the ferrous sulfate and sulfuric acid are changed to produce the paper stoichiometric ratio for each specific compound. The temperature, the pressure and the reaction time are also adjusted within the ranges specified in the patent application.

$Fe_5(SO_4)_7OH$ where n=5 and y=1

$Fe_6(SO_4)_8(OH)_2$ where n=6 and y=2 and $Fe_7(SO_4)_{10}OH$ where n=7 and y=1

Thus processes for producing ferric sulphate compounds of the generic formula;

$$Fe_n(SO_4)_{\frac{3n-y}{2}}(OH)_y$$

have been described by oxidation of ferrous sulphate in accordance with the equation:

$$nFeSO_4 + \frac{n-y}{2}(H_2SO_4) + \frac{n}{2}(NO) \rightarrow$$

$$Fe_n(SO_4)_{(\frac{3n-y}{2})}(OH)_y + \frac{n}{2}(NO) + \frac{n-2y}{2}(H_2O)$$

As many changes can be made to the embodiments of the invention without departing from the scope of the invention, it is intended that all material contained herein be interpreted as illustrative of the invention and not in a limiting sense.

The embodiments of the invention in which an exclusive property or privilege is claimed are as follows:

1. A process for the manufacture of ferric sulphate compounds from ferrous sulphate in a closed vessel containing a liquid phase and a vapour phase, the process comprising the oxidation of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2} NO_2 \rightarrow$ $$Fe_n(SO_4)_{(\frac{3n-y}{2})}(OH)_y + \left(\frac{n-2y}{2}\right)(H_2O) + \frac{n}{2} NO$$

wherein n is any integer greater than or equal to two (2) and y is any integer which is equal to, or greater than zero (0) and less than 3n and wherein the oxidation of $Fe^{++}$ is affected by spraying the liquid phase including a solution containing $Fe^{++}$ introduced to the closed vessel, through a reacting cloud comprising NO, $NO_2$ and $O_2$ enclosed in the vapour space of the closed vessel and wherein substantially only Ferric ions is present in the liquid phase in the closed vessel relative to the amounts of Ferric and Ferrous ions prior to the addition of $FeSO_4$.

2. The process of claim 1 wherein the liquid phase fills about ⅓ of the vessel.

3. The process of claim 2 wherein the process is carried out continuously the one vessel.

4. The process of claim 2 wherein the amount of the Ferric in the $$Fe_n(SO_4)_{(\frac{3n-y}{2})}(OH)_y$$

present in the liquid phase relative to the amount of Ferric and Ferrous ion prior to the addition of $FeSO_4$ exceeds about 95%.

5. The process of claim 4 wherein the process is carried out continuously the one vessel.

6. The process of claim 1 wherein the amount of the Ferric in the $$Fe_n(SO_4)_{(\frac{3n-y}{2})}(OH)_y$$

present in the liquid phase relative to the amount of Ferric and Ferrous ion prior to the addition of $FeSO_4$ exceeds about 95%.

7. The process of claim 6 wherein the process is carried out continuously the one vessel.

8. The process of claim 1 wherein the process is carried out continuously the one vessel.

9. A process for the manufacture of ferric sulphate compounds from ferrous sulphate in a closed vessel containing a liquid phase and a vapour phase, the process comprising the oxidation of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2} NO_2 \rightarrow$ $$Fe_n(SO_4)_{(\frac{3n-y}{2})}(OH)_y + \left(\frac{n-2y}{2}\right)(H_2O) + \frac{n}{2} NO$$

wherein n is any integer greater than or equal to two (2) and y is any integer which is equal to, or greater than zero (0) and less than 3n and wherein the oxidation of $Fe^{++}$ is affected by spraying a the liquid phase including a solution containing $Fe^{++}$ introduced to the closed vessel, through a reacting cloud comprising NO, $NO_2$ and $O_2$ enclosed in the vapour space of the closed vessel and substantially only Ferric ion relative to the amounts of Ferric and Ferrous ions is present in the liquid phase in the closed vessel during the addition of $FeSO_4$.

10. The process of claim 9 wherein the liquid phase fills about ⅓ of the vessel.

11. The process of claim 9 wherein the amount of the Ferric in the $$Fe_n(SO_4)_{(\frac{3n-y}{2})}(OH)_y$$

present in the liquid phase relative to the amount of Ferric and Ferrous ion during the addition of $FeSO_4$ exceeds about 95%.

12. The process of claim 10 wherein the amount of the Ferric in the $$Fe_n(SO_4)_{(\frac{3n-y}{2})}(OH)_y$$

present in the liquid phase relative to the amount of Ferric and Ferrous ion during the addition of $FeSO_4$ exceeds about 95%.

13. The process of claim 10 wherein the process is carried out continuously the one vessel.

14. The process of claim 12 wherein the process is carried out continuously the one vessel.

15. The process of claim 11 wherein the process is carried out continuously the one vessel.

16. The process of claim 9 wherein the process is carried out continuously in the vessel.

17. The process of claim 16 wherein y is 0 and n is 1 thereby producing ferric sulphate.

18. The process of claim 16 wherein a compound selected from $Fe_5(SO_4)_7(OH)$, $Fe_6(SO_4)_8(OH)_2$, or $Fe_7(SO_4)_{10}(OH)$ is produced.

19. The process of claim 1, or 9 wherein y is O and n is 1 thereby producing ferric sulphate.

20. The process of claim 1, or 9 wherein a compound selected from $Fe_5(SO_4)_7(OH)$, $Fe_6(SO_4)_8(OH)_2$, or $Fe_7(SO_4)_{10}(OH)$ is produced.

21. A process for the manufacture of ferric sulphate compounds from ferrous sulphate in a closed vessel containing a liquid phase and a vapour phase, the process comprising the oxidation between about 70° C. to about 150° C. of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2} NO_2 \rightarrow$ $Fe_n(SO_4)_{(\frac{3n-y}{2})}(OH)_y + \left(\frac{n-2y}{2}\right)(H_2O) + \frac{n}{2} NO$ wherein n is any integer greater than or equal to two (2) and y is any integer which is equal to, or greater than zero (0) and less than 3n and wherein the oxidation of $Fe^{++}$ is affected by spraying a solution containing $Fe^{++}$ through a reacting cloud comprising NO, $NO_2$ and $O_2$ enclosed in the vapour space of the closed vessel and wherein the liquid phase fills at least ⅓ of the vessel and substantially only $Fe_n(SO_4)_{(\frac{3n-y}{2})}(OH)_y$ is present in the liquid phase in the closed vessel prior to the addition of $FeSO_4$ and wherein the liquid phase is sprayed through the vapour phase.

22. The process of claim 21 wherein the process is carried out continuously in one vessel.

23. The process of claim 22 wherein $FeSO_4$ and water are added in a sluice tank and mixed and the resultant solution is added to the vessel.

24. The process of claim 23 wherein the $Fe_n(SO_4)_{(\frac{3n-y}{2})}$ solution is supplied to a denitrator where oxygen is supplied to denitrate said solution and the resultant gas is then passed to said vessel from the denitrator.

25. The process of claim 21 wherein successive batches are produced in the same vessel, and part of the volume of the earlier batch is removed leaving a portion comprising substantially only $Fe_n(SO_4)_{(\frac{3n-y}{2})}(OH)_y$.

26. A process for the manufacture of ferric sulphate compounds from ferrous sulphate in a closed vessel containing a liquid phase and a vapour phase, the process comprising the oxidation between about 70° C. to about 150° C. of $Fe^{++}$ to $Fe^{+++}$ under pressure utilizing commercial oxygen in the closed vessel using NOx as a catalyst where x is a number between 1 and 2 inclusive of 1 and 2 and wherein the process comprises the following reactions:

1) $NO + \frac{1}{2} O_2 \rightarrow NO_2$, and

2) $nFeSO_4 + \left(\frac{n-y}{2}\right)H_2SO_4 + \frac{n}{2} NO_2 \rightarrow$ $Fe_n(SO_4)_{(\frac{3n-y}{2})}(OH)_y + \left(\frac{n-2y}{2}\right)(H_2O) + \frac{n}{2} NO$ wherein n is any integer greater than or equal to two (2) and y is any integer which is equal to, or greater than zero (0) and less than 3n and wherein the oxidation of $Fe^{++}$ is affected by spraying a solution containing $Fe^{++}$ through a reacting cloud comprising NO, $NO_2$ and $O_2$ enclosed in the vapour space of the closed vessel and wherein the liquid phase fills at least ⅓ of the vessel and substantially only $Fe_n(SO_4)_{(\frac{3n-y}{2})}(OH)_y$ is present in the liquid phase in the closed vessel during the addition of $FeSO_4$ and wherein the liquid phase is sprayed through the vapour phase.

27. The process of claim 26 wherein the process is carried out continuously in one vessel.

28. The process of claim 27 wherein $FeSO_4$ and water are added in a sluice tank and mixed and the resultant solution is added to the vessel.

29. The process of claim 28 wherein the $Fe_n(SO_4)_{(\frac{3n-y}{2})}$ solution is supplied to a denitrator where oxygen is supplied to denitrate said solution and the resultant gas is then passed to said vessel from the denitrator.

30. The process of claim 26 wherein successive batches are produced in the same vessel, and part of the volume of the earlier batch is removed leaving a portion comprising substantially only $Fe_n(SO_4)_{(\frac{3n-y}{2})}(OH)_y$.

31. The process of claim 21 or 26 wherein y is O and n is 1 thereby producing ferric sulphate.

32. The process of claim 21 or 26 wherein a compound selected from $Fe_5(SO_4)_7(OH)$, $Fe_6(SO_4)_8(OH)_2$, or $Fe_7(SO_4)_{10}(OH)$ is produced.

33. The process of claim 22, 27 or 8 wherein y is O and n is 1 thereby producing ferric sulphate.

34. The process of claim 22, 27 or 8 wherein a compound selected from $Fe_5(SO_4)_7(OH)$, $Fe_6(SO_4)_8(OH)_2$, or $Fe_7(SO_4)_{10}(OH)$ is produced.

35. The process of claim 1, 9, 21 or 26 wherein $Fe_5(SO_4)_7(OH)$ is produced.

36. The process of claim 1, 9, 21 or 26 wherein $Fe_6(SO_4)_8(OH)_2$ is produced.

37. The process of claim 1, 2, 21 or 26 wherein $Fe_7(SO_4)_{10}(OH)$ is produced.

* * * * *